United States Patent
Sun et al.

(10) Patent No.: US 12,111,268 B2
(45) Date of Patent: Oct. 8, 2024

(54) SURFACE INSPECTION SYSTEM FOR FOIL ARTICLE

(71) Applicants: Kapito Inc., Hsinchu (TW); Feng-Tso Sun, Hsinchu (TW); Yi-Ting Yeh, Hsinchu (TW); Feng-Yu Sun, Hsinchu (TW)

(72) Inventors: Feng-Tso Sun, Hsinchu (TW); Yi-Ting Yeh, Hsinchu (TW); Feng-Yu Sun, Hsinchu (TW); Shiang-En Hong, Hsinchu (TW); Po-Han Chou, Hsinchu (TW); Hui-Pu Chang, Hsinchu (TW); Yun-Yi Chen, Hsinchu (TW); Jyun-Tang Huang, Hsinchu (TW)

(73) Assignees: Kapito Inc., Hsinchu (TW); Feng-Tso Sun, Hsinchu (TW); Yi-Ting Yeh, Hsinchu (TW); Feng-Yu Sun, Hsinchu (TW)

( * ) Notice: Subject to any disclaimer, the term of this patent is extended or adjusted under 35 U.S.C. 154(b) by 98 days.

(21) Appl. No.: 17/989,441

(22) Filed: Nov. 17, 2022

(65) Prior Publication Data

US 2023/0168208 A1   Jun. 1, 2023

(30) Foreign Application Priority Data

Dec. 1, 2021 (TW) ................................. 110144818

(51) Int. Cl.
*G01N 21/88* (2006.01)
*G01N 21/89* (2006.01)
(Continued)

(52) U.S. Cl.
CPC ......... *G01N 21/8851* (2013.01); *G01N 21/89* (2013.01); *G06T 7/001* (2013.01);
(Continued)

(58) Field of Classification Search
CPC ............... G01N 21/8851; G01N 21/89; G01N 2021/8887; G01N 21/8914; G01N 21/892;
(Continued)

(56) References Cited

U.S. PATENT DOCUMENTS 7,420,671 B2 * 9/2008 Sonda .................. G01N 21/896
356/239.5
10,989,668 B2    4/2021 Li et al.
(Continued)

FOREIGN PATENT DOCUMENTS

CN         206348279 U  *  7/2017  ........... G01N 21/892
CN         109765236 A  *  5/2019
(Continued)

*Primary Examiner* — Michael Lee
(74) *Attorney, Agent, or Firm* — ANOVA LAW GROUP, PLLC

(57) ABSTRACT

A surface inspection system for foil article is disclosed. The surface inspection system comprises a box having a top long narrow opening and a bottom long narrow opening, a bridge interface, a first light source, a second light source, a first modular camera device having a first camera, and a second modular camera device having a second camera. In which, the first light source, the second light source, the first modular camera device, and the second modular camera device all accommodated in the box, and are coupled to a control box through the bridge interface. Particularly, this surface inspection system is allowed to be integrated in an automatic production line of a foil article like electro-forming aluminum foil (also called electronic aluminum foil), so as to achieve an in-line inspection of the surface morphology of the electro-forming aluminum foil.

16 Claims, 7 Drawing Sheets

(51) Int. Cl.
 *G06T 7/00* (2017.01)
 *H04N 23/51* (2023.01)
 *H04N 23/56* (2023.01)

(52) U.S. Cl.
 CPC ............. *H04N 23/51* (2023.01); *H04N 23/56* (2023.01); *G01N 2021/8887* (2013.01); *G06T 2207/30108* (2013.01)

(58) Field of Classification Search
 CPC ... G01N 2021/8912; G01N 2021/8918; G01N 21/8903; G06T 7/001; G06T 2207/30108; H04N 23/51; H04N 23/56
 See application file for complete search history.

(56) References Cited

U.S. PATENT DOCUMENTS

| | | | | |
|---|---|---|---|---|
| 11,961,770 | B2* | 4/2024 | Lin | ................... H01L 21/67288 |
| 2013/0077093 | A1* | 3/2013 | Hamada | ................ G01N 21/898 |
| | | | | 356/238.3 |
| 2018/0288399 | A1* | 10/2018 | Peeters | ................ H04N 13/243 |
| 2020/0410662 | A1* | 12/2020 | Jha | ..................... G01N 21/8806 |
| 2022/0214286 | A1* | 7/2022 | Yacoubian | ......... G01N 21/9515 |

FOREIGN PATENT DOCUMENTS

| | | | |
|---|---|---|---|
| CN | 209148559 U | * | 7/2019 |
| CN | 110288584 A | | 9/2019 |
| CN | 113706461 A | | 11/2021 |
| TW | 201809640 A | | 3/2018 |

\* cited by examiner

SURFACE INSPECTION SYSTEM FOR FOIL ARTICLE

BACKGROUND OF THE INVENTION

1. Field of the Invention

The present invention relates to the technology field of automated optical inspection (AOI) systems, and more particularly to a surface inspection system for foil article.

2. Description of the Prior Art

Electro-etching/forming aluminum foil is a multi-use electronic aluminum foil, and has been widely applied in the manufacture of various electronic components, for example, aluminum electrolytic capacitor.

As explained in more detail below, the electronic aluminum foil is used as an anode electrode and a cathode electrode of the aluminum electrolytic capacitor, such that it is able to enlarge the capacitance of the aluminum electrolytic capacitor by way of (1) increasing the dielectric constant, (2) increasing the surface area of the electronic aluminum foil, and/or (3) decreasing the distance between the two electrodes. Nowadays, electrolytic (electrochemical) corrosion is developed so as to be applied in the increase of the surface area of the electronic aluminum foil. After an aluminum foil receives an electrolytic corrosion treatment, a micro-roughing structure consisting of a large number of corrosion holes (also called pitting holes) is formed on the surface of the aluminum foil. Furthermore, a forming treatment is subsequently applied to the aluminum foil, so as to coat an $Al_2O_3$ film on the aluminum foil. As a result, an electro-forming aluminum foil (also called electronic aluminum foil) is obtained.

Nowadays, an automatic production line is developed for conducting the mass production of the electronic aluminum foil. Therefore, it is imaginable that, the variation of any one of environment factors, equipment states and raw material's quality may lead the micro-roughing structure formed on the surface of the aluminum foil to have a change, thereby leading the capacitor of an electrolytic capacitor using two aforesaid electronic aluminum foils as a cathode electrode and an anode electrode thereof to have undesirable increase/reduction. For above reasons, there is a need to apply an automated optical inspection system in the automatic production line for real-time inspecting the micro-roughing structure formed on the surface of the aluminum foil.

Accordingly, inventors of the present application have made great efforts to make inventive research and eventually provided a surface inspection system for foil article.

SUMMARY OF THE INVENTION

The primary objective of the present invention is to disclose a surface inspection system for foil article, comprising: a box having a top long narrow opening and a bottom long narrow opening, a bridge interface, a first light source, a second light source, a first modular camera device having a first camera, and a second modular camera device having a second camera. In which, the first light source, the second light source, the first modular camera device, and the second modular camera device are all accommodated in the box, and are coupled to a control box through the bridge interface. Particularly, this surface inspection system is allowed to be integrated in an automatic production line of a foil article like electro-forming aluminum foil (also called electronic aluminum foil), so as to achieve an in-line inspection of the surface morphology of the electro-forming aluminum foil.

For achieving the primary objective mentioned above, the present invention provides an embodiment of the surface inspection system for foil article, comprising:
- a box, having a top long narrow opening and a bottom long narrow opening, such that a foil article is allowed to be fed into the box via the top long narrow opening, and being also allowed to be discharged from the box through the bottom long narrow opening;
- a bridge board, being disposed in the box, and comprising a power inlet and a power switch exposed out of the box;
- a first light source, being disposed in the box so as to be adjacent to a first side of the box, wherein the first light source is coupled to the bridge board, and there being a first spacing existing between the first light source and a bottom side of the box;
- a second light source, being disposed in the box so as to be adjacent to a second side of the box, wherein the second light source is coupled to the bridge board, and there being one said first spacing existing between the second light source and the bottom side of the box;
- a first modular camera device, being disposed in the box so as to be adjacent to the first side of the box, wherein the first modular camera device is coupled to the bridge board, and there being a second spacing existing between the first modular camera device and the bottom side of the box;
- a second modular camera device, being disposed in the box so as to be adjacent to the second side of the box, wherein the second modular camera device is coupled to the bridge board, and there being said second spacing between the second modular camera device and the bottom side of the box;
- wherein the second spacing is larger than the first spacing;
- wherein the first modular camera device comprises a first housing case and at least one first camera accommodated in the first housing case, and the at least one first camera being exposed out of the first housing case by a first lens thereof, such that the first lens faces to a first surface of the foil article in the box; and
- wherein the second modular camera device comprises a second housing case and at least one second camera accommodated in the second housing case, and the at least one second camera being exposed out of the second housing case by a second lens thereof, such that the second lens faces to a second surface of the foil article in the box.

In one embodiment, the bridge board further comprises a first communication interface, and a control box, coupled to the first light source, the second light source, the first modular camera device, and the second modular camera device, is communicated with the first communication interface by a second communication interface thereof.

In one embodiment, the control box further has a third communication interface, so as to be in communication with a host electronic device of a production system of the foil article.

In one embodiment, the first light source and the second light source are both a linear light source.

In one embodiment, the first communication interface, the second communication interface and the third communication interface are all selected from a group consisting of Ethernet interface, Wi-Fi interface, 4G mobile communication interface, and 5G mobile communication interface.

In one embodiment, an electronic length meter is disposed to inside or outside the box, and is coupled to the control box, such that the control box controls the electronic length meter to count a length of the foil article.

In one embodiment, a first electronic device is disposed in the first housing case so as to be coupled to the first camera, the first electronic device comprises a first processor and a first memory storing an application program that includes instructions, and the application program consists of a plurality of subprograms; the plurality of subprograms comprises:

- a first subprogram, being compiled to be integrated in the application program by one type of programming language, and including instructions for configuring the first processor to control the first light source to emit a first detection light for irradiating the first surface of the foil article;
- a second subprogram, being compiled to be integrated in the application program by one type of programming language, and including instructions for configuring the first processor to control the first camera acquire a first image from the first surface of the foil article;
- a third subprogram, being compiled to be integrated in the application program by one type of programming language, and including instructions for configuring the first processor to extract a first surface feature from the first image;
- a fourth subprogram, being compiled to be integrated in the application program by one type of programming language, and including instructions for configuring the first processor to utilize a pre-trained defect reorganization model to determine whether there are existing any surface defects in the first surface of the foil article by matching the first surface feature with a reference defect feature; and
- a fifth subprogram, being compiled to be integrated in the application program by one type of programming language, and including instructions for configuring the first processor to produce a first surface profile image of the first surface of the foil article based on the first surface feature.

In one embodiment, a second electronic device is disposed in the second housing case so as to be coupled to the second camera, the second electronic device comprises a second processor and a second memory storing an application program that includes instructions, and the application program consists of a plurality of subprograms; the plurality of subprograms comprises:

- a sixth subprogram, being compiled to be integrated in the application program by one type of programming language, and including instructions for configuring the second processor to control the second light source to emit a second detection light for irradiating the second surface of the foil article;
- a seventh subprogram, being compiled to be integrated in the application program by one type of programming language, and including instructions for configuring the second processor to control the second camera acquire a second image from the second surface of the foil article;
- an eighth subprogram, being compiled to be integrated in the application program by one type of programming language, and including instructions for configuring the second processor to extract a second surface feature from the second image;
- a ninth subprogram, being compiled to be integrated in the application program by one type of programming language, and including instructions for configuring the second processor to utilize said pre-trained defect reorganization model to determine whether there are existing any surface defects in the second surface of the foil article by matching the second surface feature with said reference defect feature; and
- a tenth subprogram, being compiled to be integrated in the application program by one type of programming language, and including instructions for configuring the second processor to produce a second surface profile image of the second surface of the foil article based on the second surface feature.

In one embodiment, a modular electronic device is disposed in the control box, the modular electronic device comprises a processor and a memory storing a plurality of programs, and the plurality of programs comprise:

- a first program, being compiled to be integrated in the application program by one type of programming language, and including instructions for configuring the processor to control the first light source and the second light source to emit a first detection light and a second detection light for irradiating the first surface and the second surface of the foil article, respectively;
- a second program, being compiled to be integrated in the application program by one type of programming language, and including instructions for configuring the processor to control the first camera and the second camera to acquire a first image and a second image from the first surface and the second surface of the foil article, respectively;
- a third program, being compiled to be integrated in the application program by one type of programming language, and including instructions for configuring the processor to extract a first surface feature and a second surface feature from the first image and the second image, respectively;
- a fourth program, being compiled to be integrated in the application program by one type of programming language, and including instructions for configuring the processor to utilize a pre-trained defect reorganization model to determine whether there are existing any surface defects in the first surface and the second surface of the foil article by matching the first surface feature and the second surface feature with said reference defect feature, respectively; and
- a fifth program, being compiled to be integrated in the application program by one type of programming language, and including instructions for configuring the processor to produce a first surface profile image of the first surface and a second surface profile image of the second surface based on the first surface feature and the second surface feature, respectively.

In one embodiment, the box is fixed in a product discharging side of a production system of the foil article through a first mounting framework, and comprising:

- a framework, being constituted by a plurality of vertical rods and a plurality of horizontal rods, and including an inner space, an upper opening, a lower opening, a front opening, a rear opening, a left opening, and a right opening, wherein the inner space, the upper opening, the lower opening, the front opening, the rear opening, the left opening, and the right opening are all communicated with the inner space;
- an upper cover, including said top long narrow opening, and being connected to the framework so as to shield the upper opening;

a lower cover, including said bottom long narrow opening, and being connected to the framework so as to shield the lower opening;

a left side plate, being connected to the framework so as to shield the left opening;

a right side plate, being connected to the framework so as to shield the right opening;

a front plate, being connected to the framework so as to shield the front opening, and including: a first opening for making the power inlet to be exposed out of the box, a second opening for making the power switch to be exposed out of the box, a third opening for making an Ethernet connector to be exposed out of the box, and a fourth opening;

a rear plate, being connected to the framework so as to shield the rear opening, and including a fifth opening;

a front cover, being connected to the front plate so as to shield the fourth opening; and a rear cover, being connected to the rear plate so as to shield the fifth opening.

In one embodiment, the first light source and the second light source are disposed on the framework through a second mounting framework and a third mounting framework, respectively, such that it is allowed to adjust the second mounting framework so as to make a first detection light emitted from the first light source irradiate the first surface of the foil article by an incidence angle, and it is also allowed to adjust the third mounting framework so as to make a second detection light emitted from the second light source irradiate the second surface of the foil article by said incidence angle.

In one embodiment, an anti-abrasion film including a narrow slit is attached onto an inner side of the upper cover, such that the narrow slit faces the top long narrow opening. Moreover, an anti-abrasion film including a narrow slit is attached onto an inner side of the lower cover, such that the narrow slit faces the bottom long narrow opening.

In one embodiment, an anti-corrosion material is coated onto the upper cover, the lower cover, the left side plate, the right side plate, the front plate, the rear plate, the front cover, the rear cover, a first case of the first light source, and a second case of the second light source.

In one embodiment, an optical axis of the first lens is vertical to the first surface of the foil article, and an optical axis of the second lens is vertical to the second surface of the foil article.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a surface inspection system for foil article according to the present invention, embodiments of the present invention will be described in detail with reference to the attached drawings hereinafter.

First Embodiment

Figure 1A:
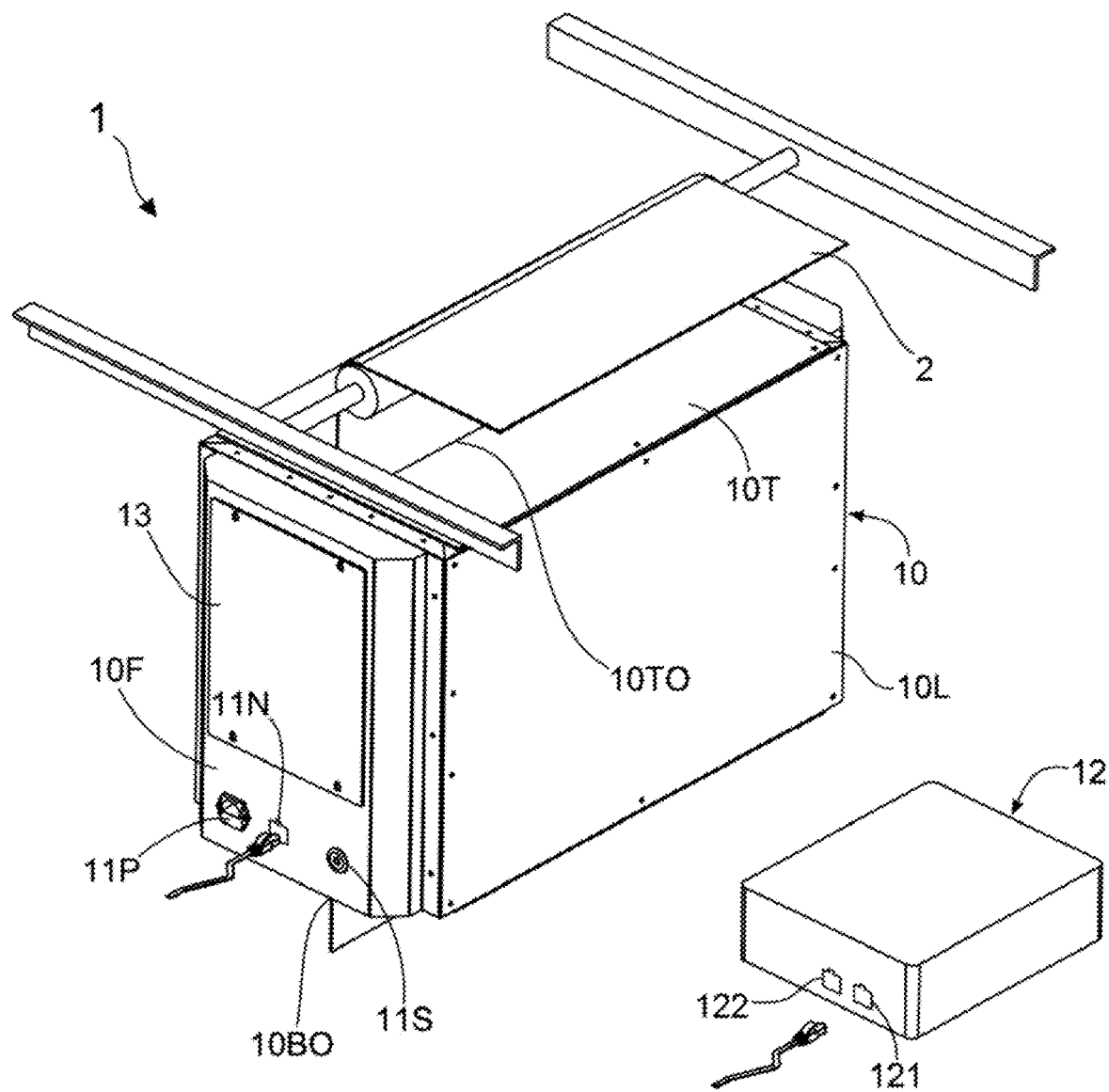
FIG. 1A shows a first stereo diagram of a surface inspection system according to the present invention.
Figure 1B:
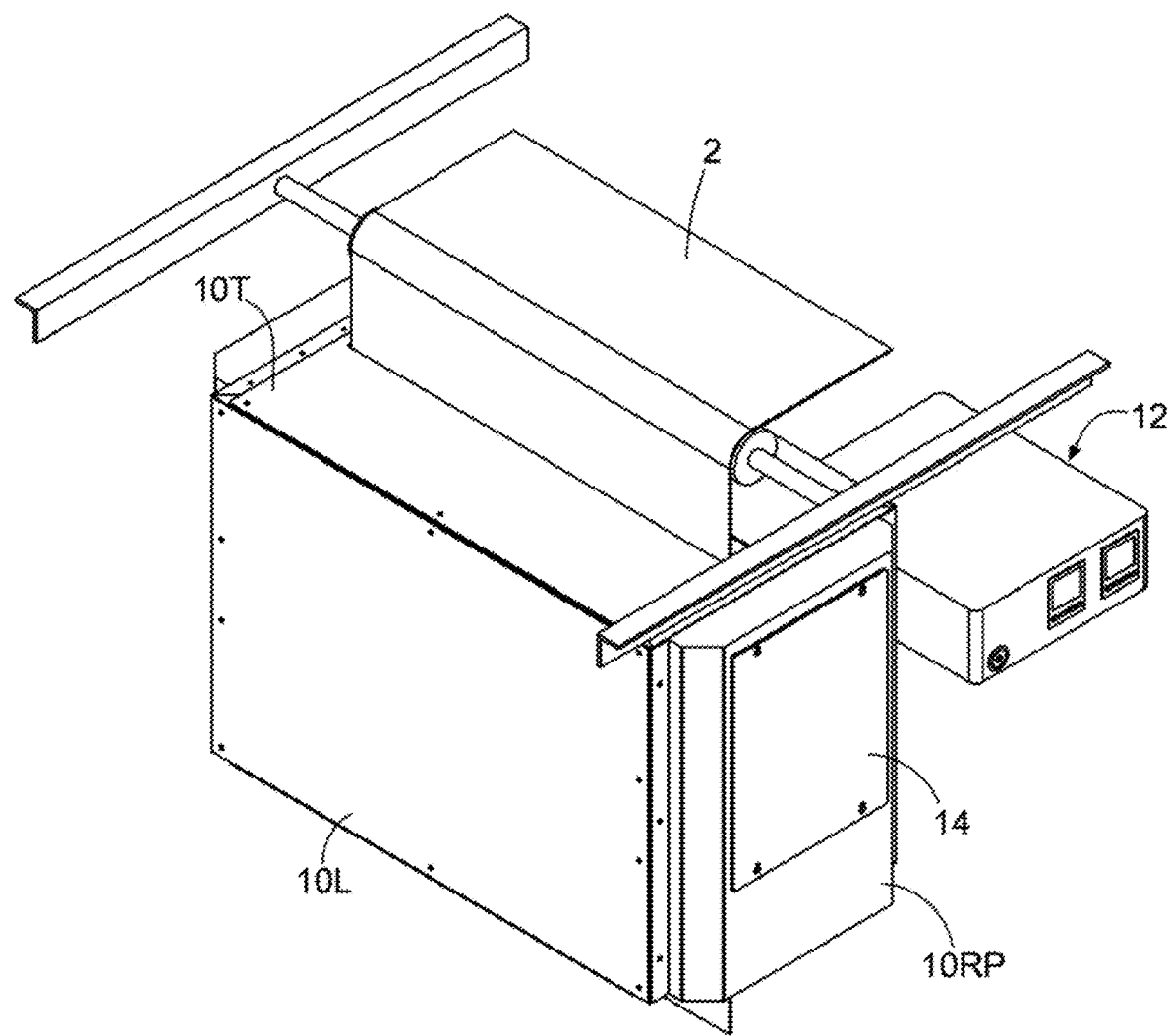
FIG. 1B shows a second stereo diagram of the surface inspection system according to the present invention.
Figure 2A:
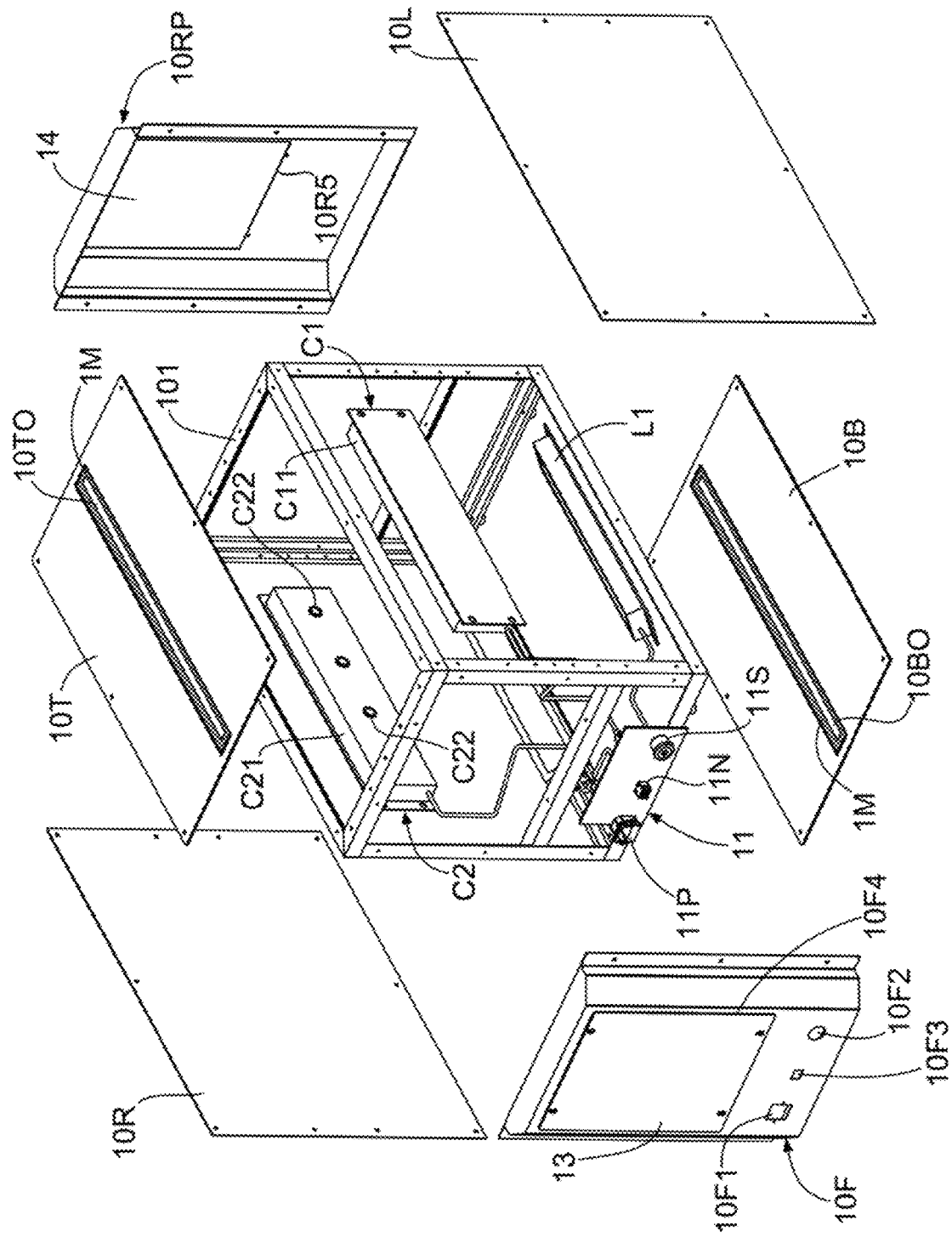
FIG. 2A shows a first exploded view of the surface inspection system according to the present invention.
Figure 2B:
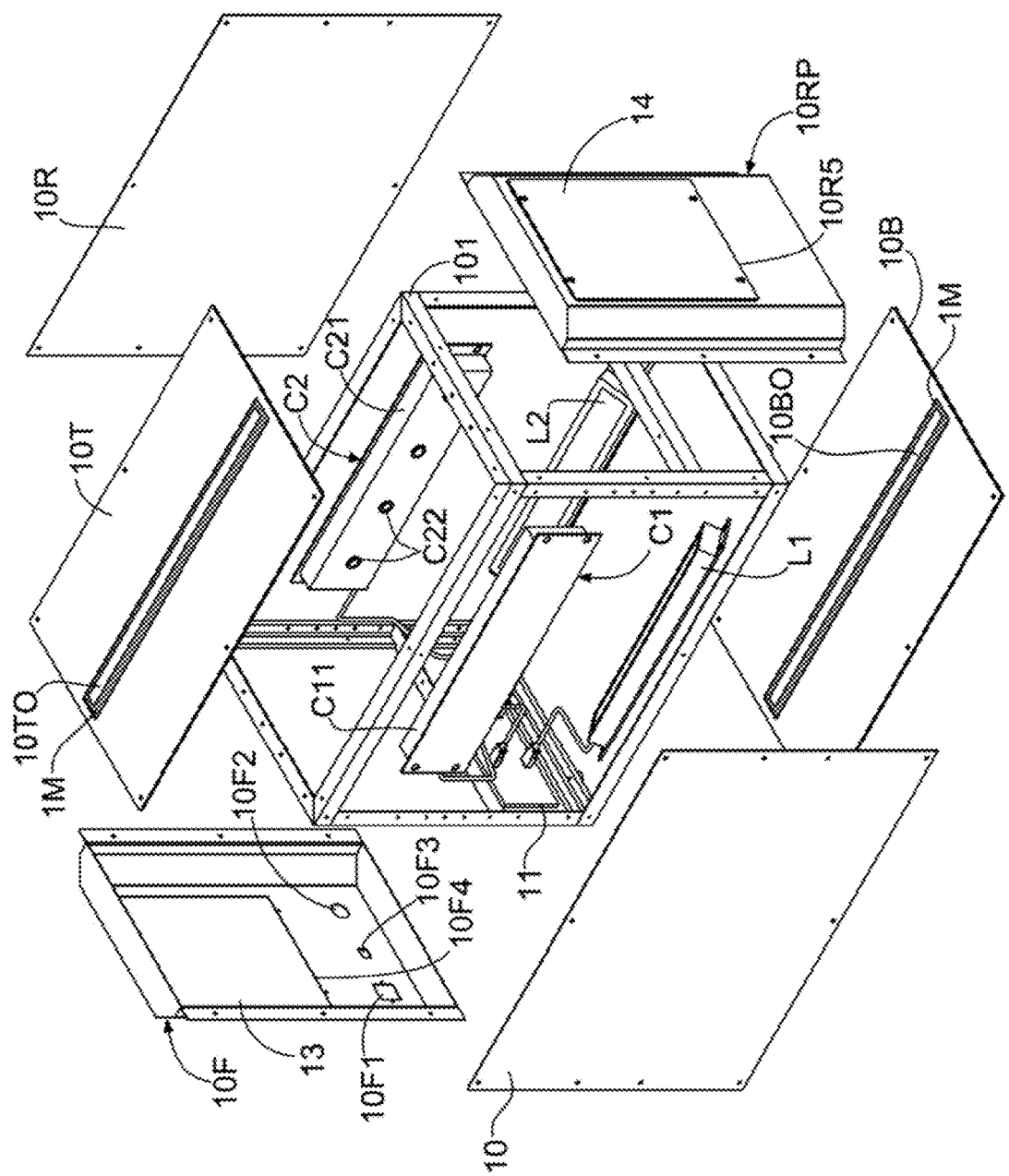
FIG. 2B shows a second exploded view of the surface inspection system according to the present invention.

With reference to FIG. 1A and FIG. 1B, there are shown a first stereo diagram and a second stereo diagram of a surface inspection system according to the present invention. Moreover, FIG. 2A and FIG. 2B illustrate a first exploded view and a second exploded view of the surface inspection system according to the present invention. The present invention discloses a surface inspection system 1, comprising: a box 10, a bridge board 11, a first light source L1, a second light source L2, a first modular camera device C1, and a second modular camera device C2.

According to the present invention, the box 10 is fixed in an product discharging side of a production system of the foil article 2 through a first mounting framework, and comprises: a framework 101, an upper cover 10T, a lower cover 10B, a left side plate 10L, a right side plate 10R, a front plate 10F, a rear plate 10RP, a front cover 13, and a rear cover 14. As FIG. 2A and FIG. 2B show, the framework 101 is constituted by a plurality of vertical rods and a plurality of horizontal rods, and includes an inner space, an upper opening, a lower opening, a front opening, a rear opening, a left opening, and a right opening, wherein the inner space, the upper opening, the lower opening, the front opening, the rear opening, the left opening, and the right opening are all communicated with the inner space. Moreover, the upper cover 10T includes a top long narrow opening 10TO, and is connected to the framework 101 so as to shield the upper opening. On the other hand, the lower cover 10B includes a bottom long narrow opening 10BO, and is connected to the framework 101 so as to shield the lower opening. By such arrangements, a foil article 2 transported from the discharging side of the production system of is allowed to be further fed into the box 10 via the top long narrow opening 10TO, and is also allowed to be discharged from the box 10 through the bottom long narrow opening 10BO. In a practicable embodiment, the foil article 2 is a metal foil, a flexible (e.g., PI) substrate, a paper, or an adhesive-coated flexible substrate.

It is seen that an anti-abrasion film 1M including a narrow slit is attached onto an inner side of the upper cover 10T, such that the narrow slit faces the top long narrow opening 10TO. Similarly, another one anti-abrasion film 1M including a narrow slit is also attached onto an inner side of the lower cover 10B, such that the narrow slit faces the bottom long narrow opening 10BO.

As FIG. 1A, FIG. 1B, FIG. 2A, and FIG. 2B show, the left side plate 10L is connected to the framework 101 so as to shield the left opening, and the right side plate 10R is connected to the framework 101 so as to shield the right opening. Moreover, the front plate 10F is connected to the framework 101 so as to shield the front opening, and includes: a first opening 10F1, a second opening 10F2, a third opening 10F3, and a fourth opening 10F4, and a front cover 13 is connected to the front plate 10F so as to shield the fourth opening 10F4. On the other hand, the rear plate 10RP, includes a fifth opening 10R5, is connected to the framework 101 so as to shield the rear opening, and the rear cover 14 is connected to the rear plate 10RP so as to shield the fifth opening 10R5.

Figure 3:
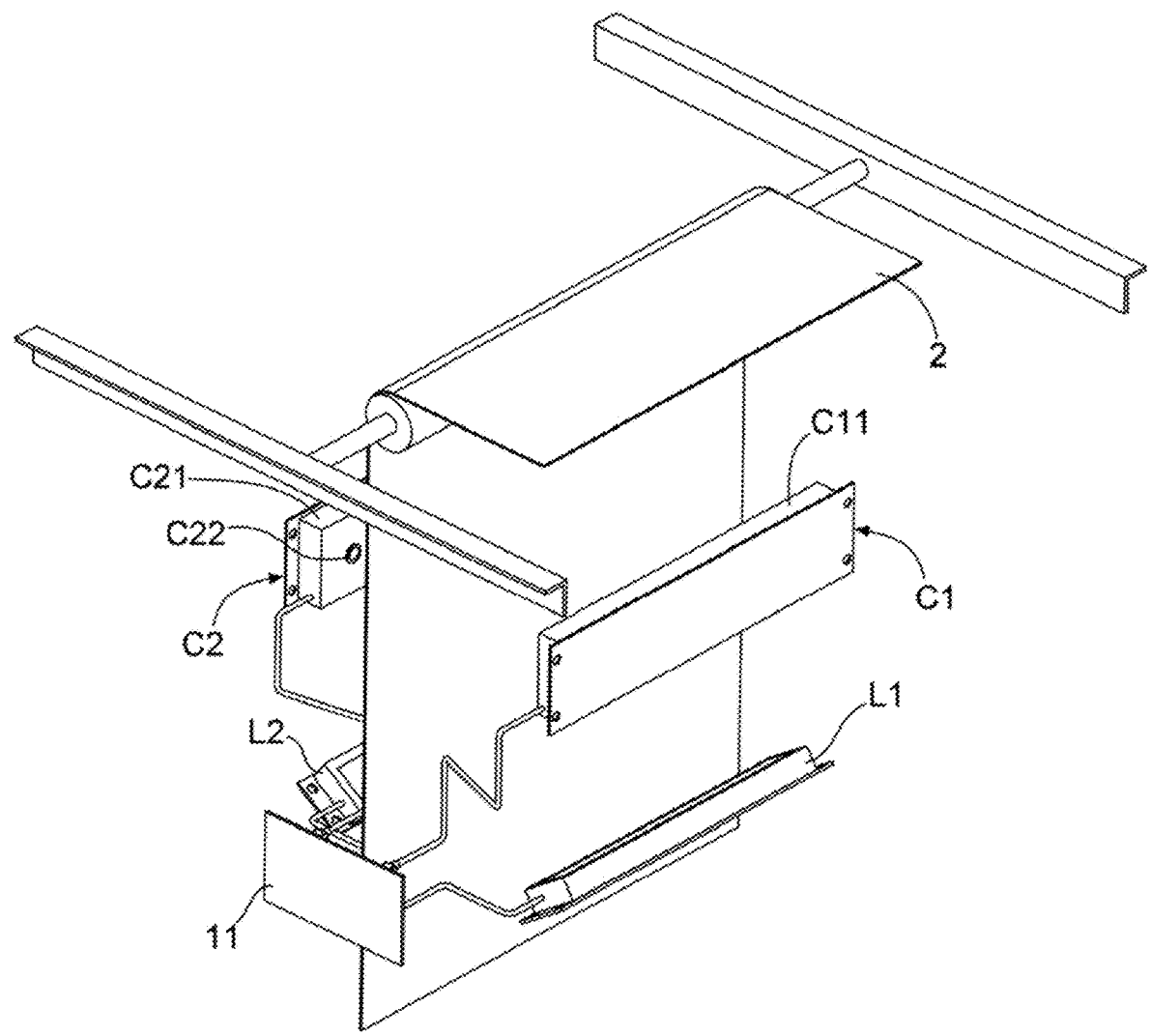
FIG. 3 shows a stereo diagram of a bridge board, a first light source, a second light source, a first modular camera device, and a second modular camera device they are shown in FIG. 2A.

FIG. 3 shows a stereo diagram of the bridge board 11, the first light source L1, the second light source L2, the first modular camera device C1, and the second modular camera device C2. As FIG. 2A, FIG. 2B and FIG. 3 show, the bridge board 11 is disposed in the box 10, and comprises a power inlet 11P, a power switch 11S and a first communication interface 11N (e.g., Ethernet connector). As described in more detail below, the power inlet 11P, the power switch 11S and the Ethernet connector (i.e., the first communication interface 11N) are exposed out of the box 10 through the first opening 10F1, the second opening 10F2, and the third opening 10F3, respectively. On the other hand, the first light source L1 is disposed in the box 10 so as to be adjacent to a first side of the box 10, wherein the first light source L1 is coupled to the bridge board 11, and there is a first spacing existing between the first light source L1 and a bottom side of the box 10. Moreover, the second light source L2 is disposed in the box 10 so as to be adjacent to a second side of the box 10, wherein the second light source L2 is coupled to the bridge board 11, and there is one said first spacing between the second light source L2 and the bottom side of the box 10.

The first light source L1 and the second light source L2 are both a linear light source. According to the present invention, the first light source L1 and the second light source L2 are disposed on the framework 101 through a second mounting framework and a third mounting framework, respectively, such that it is allowed to adjust the second mounting framework so as to make a first detection light emitted from the first light source L1 irradiate a first surface of the foil article 2 by an incidence angle. Similarly, it is also allowed to adjust the third mounting framework so as to make a second detection light emitted from the second light source L2 irradiate a second surface of the foil article 2 by said incidence angle. In a practicable embodiment, the incidence angle is in a range between 15 degrees and 60 degrees.

As FIG. 2A, FIG. 2B and FIG. 3 show, the first modular camera device C1 is disposed in the box 10 so as to be adjacent to the first side of the box 10, wherein the first modular camera device C1 is coupled to the bridge board 11, and there is a second spacing existing between the first modular camera device C1 and the bottom side of the box 10. According to the present invention, the first modular camera device C1 comprises a first housing case C11 and at least one first camera C12 accommodated in the first housing case C11, and the at least one first camera C12 is exposed out of the first housing case C11 by a first lens thereof, such that the first lens faces to the first surface of the foil article 2 in the box 10. On the other hand, the second modular camera device C2 is disposed in the box 10 so as to be adjacent to the second side of the box 10, wherein the second modular camera device C2 is coupled to the bridge board 11, and there is one said second spacing existing between the second modular camera device C2 and the bottom side of the box 10. According to the present invention, the second modular camera device C2 comprises a second housing case C21 and at least one second camera C22 accommodated in the second housing case C21, and the at least one second camera C22 is exposed out of the second housing case C21 by a second lens thereof, such that the second lens faces to the second surface of the foil article 2 in the box 10. In one embodiment, the second spacing is larger than the first spacing.

For example, the foil article 2 is an electro-forming aluminum foil (also called electronic aluminum foil). The electro-forming aluminum foil is known used as an anode electrode and a cathode electrode of an aluminum electrolytic capacitor. It is able to enlarge the capacitance of the electronic aluminum foil by increasing the surface area of the electronic aluminum foil. Nowadays, electrolytic (electrochemical) corrosion is developed so as to be applied in the increase of the surface area of the electronic aluminum foil. After an aluminum foil receives an electrolytic corrosion treatment, a micro-roughing structure consisting of a large number of corrosion holes (also called pitting holes) is formed on the surface of the aluminum foil. Furthermore, a forming treatment is subsequently applied to the aluminum foil, so as to coat an $Al_2O_3$ film on the aluminum foil. As a result, an electro-forming aluminum foil (also called electronic aluminum foil) is obtained. Therefore, the box 10 can be fixed in a product discharging side of the equipment for conducting the electrolytic (electrochemical) corrosion, such that the electro-forming aluminum foil is allowed to be fed into the box 10 via the top long narrow opening 10TO, and is also allowed to be discharged from the box 10 through the bottom long narrow opening 10BO.

Particularly, an anti-corrosion material is coated onto the upper cover 10T, the lower cover 10B, the left side plate 10L, the right side plate 10R, the front plate 10F, the rear plate 10RP, the front cover 13, the rear cover 14, a first case of the first light source L1, and a second case of the second light source L2. By such arrangements, the box 10 is protected, by the anti-corrosion layer, from being corroded by gas and/or solutions. In addition, because this anti-corrosion layer is also an electric insulator, there is no arc spark produced between the foil article 2 (i.e., the electro-forming aluminum foil) and the box 10 in case of the foil article 2 is fed into the box 10 or discharged from the box 10.

Figure 4:
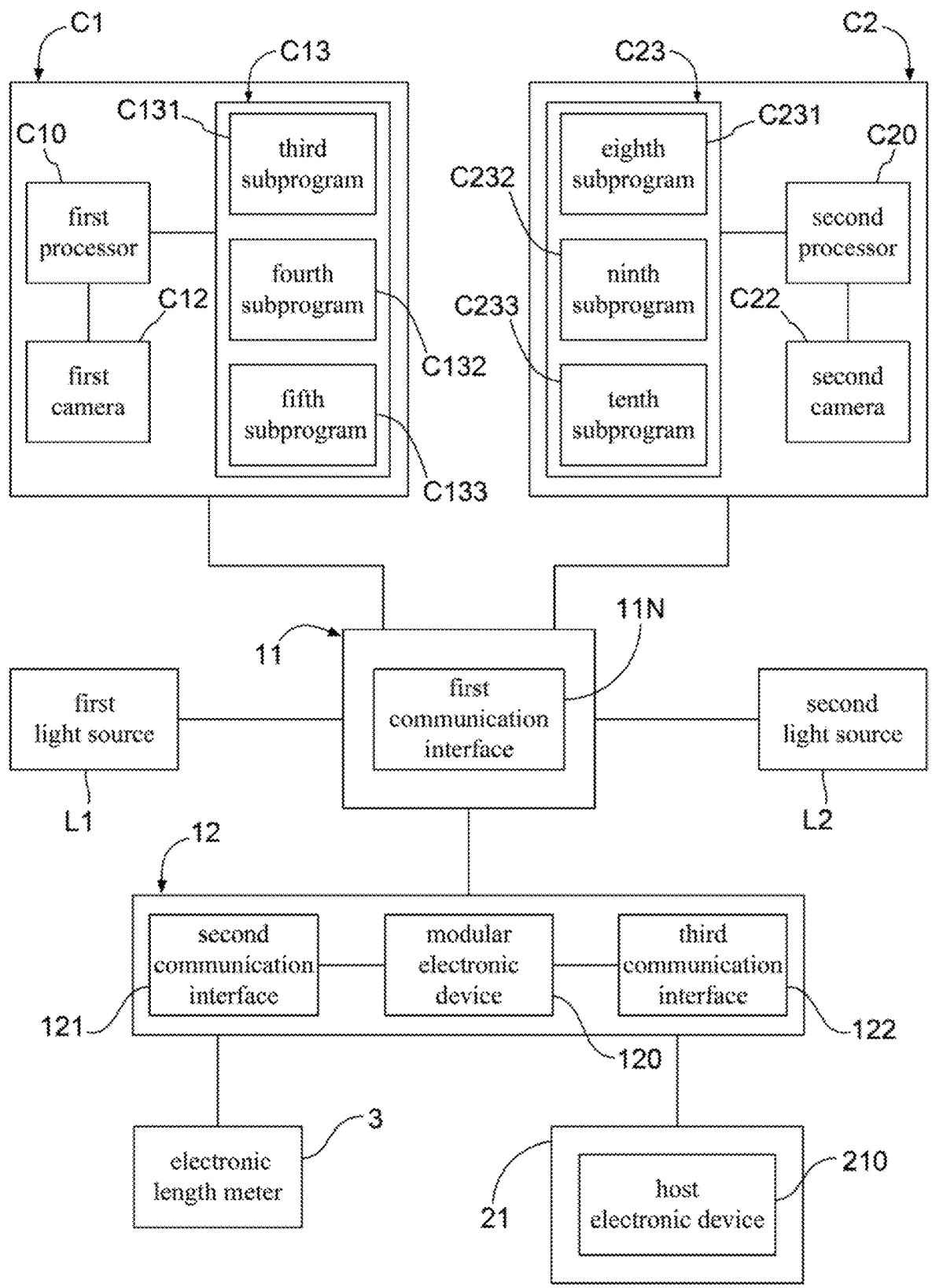
FIG. 4 shows a block diagram of the bridge board, the first light source, the second light source, the first modular camera device, and the second modular camera device they are shown in FIG. 2A.

FIG. 4 shows a block diagram of the bridge board 11, the first light source L1, the second light source L2, the first modular camera device C1, and the second modular camera device C2. As FIG. 2A, FIG. 3 and FIG. 4 show, the surface inspection system 1 further comprises a control box 12, wherein the control box 12 has a second communication interface 121 so as to be in communication with the first communication interface 11N (e.g., Ethernet connector), and is coupled to the first light source L1, the second light source L2, the first modular camera device C1, and the second modular camera device C2. On the other hand, the control box 12 further has a third communication interface 122, such that the control box 12 is able to communicate with a host electronic device 210 of the production system 21 of the foil article 2. In a practicable embodiment, the first communication interface 11N, the second communication interface 121 and the third communication interface 122 all can be an Ethernet interface, a Wi-Fi interface, a 4G mobile communication interface, or a 5G mobile communication interface. In addition, an electronic length meter 3 is disposed to inside or outside the box 10, and is coupled to the control box 12, such that the control box 12 controls the electronic length meter 3 to count a length of the foil article 2.

According to the present invention, an optical axis of the first lens of the first camera C12 is vertical to the first surface of the foil article 2, and an optical axis of the second lens of the second camera C22 is vertical to the second surface of the foil article 2. As FIG. 2A, FIG. 2B, FIG. 3, and FIG. 4 show, a first electronic device is disposed in the first housing case C11 so as to be coupled to the first camera C12. The first electronic device comprises a first processor C10 and a first memory C13 storing an application program that includes instructions, the application program consists of a plurality of subprograms, and the plurality of subprograms comprises a first subprogram, a second subprogram, a third subprogram C131, a fourth subprogram C132, and a fifth subprogram C133. According to the present invention, the first subprogram is compiled to be integrated in the application program by one type of programming language, and includes instructions for configuring the first processor C10 to control the first light source L1 to emit a first detection light for irradiating the first surface of the foil article 2. Moreover, the second subprogram is compiled to be integrated in the application program by one type of programming language, and includes instructions for configuring the first processor C10 to control the first camera C12 acquire a first image from the first surface of the foil article 2.

As FIG. 2A, FIG. 2B, FIG. 3, and FIG. 4 show, the third subprogram C131 is compiled to be integrated in the application program by one type of programming language, and includes instructions for configuring the first processor C10 to extract a first surface feature from the first image. Moreover, the fourth subprogram C132 is compiled to be integrated in the application program by one type of programming language, and includes instructions for configuring the first processor C10 to utilize a pre-trained defect reorganization model so as to determine whether there are existing any surface defects in the first surface of the foil article 2 by matching the first surface feature with a reference defect feature. Furthermore, the fifth subprogram C133 is compiled to be integrated in the application program by one type of programming language, and includes instructions for configuring the first processor C10 to produce a first surface profile image of the first surface of the foil article 2 based on the first surface feature.

According to the present invention, a first electronic device is disposed in the second housing case C21 so as to be coupled to the second camera C22. The second electronic device comprises a second processor C20 and a second memory C23 storing an application program that includes instructions, the application program consists of a plurality of subprograms, and the plurality of subprograms comprises a sixth subprogram, a seventh subprogram, an eighth subprogram C231, a ninth subprogram C232, and a tenth subprogram C233. According to the present invention, the sixth subprogram is compiled to be integrated in the application program by one type of programming language, and includes instructions for configuring the second processor C20 to control the second light source L2 to emit a second detection light for irradiating the second surface of the foil article 2. Moreover, the seventh subprogram is compiled to be integrated in the application program by one type of programming language, and includes instructions for configuring the second processor C20 to control the second camera C22 acquire a second image from the second surface of the foil article 2.

As FIG. 2A, FIG. 2B, FIG. 3, and FIG. 4 show, the eighth subprogram C231 is compiled to be integrated in the application program by one type of programming language, and includes instructions for configuring the second processor C20 to extract a second surface feature from the second image. Moreover, the ninth subprogram C232 is compiled to be integrated in the application program by one type of programming language, and includes instructions for configuring the second processor C20 to utilize said pre-trained defect reorganization model so as to determine whether there are existing any surface defects in the second surface of the foil article 2 by matching the second surface feature with said reference defect feature. Furthermore, the tenth subprogram C233 is compiled to be integrated in the application program by one type of programming language, and includes instructions for configuring the second processor C20 to produce a second surface profile image of the second surface of the foil article 2 based on the first surface feature.

It is understood that, the control box 12 receives the first surface profile image and the second surface profile image from the first modular camera device C1 and the second modular camera device C2, respectively, and then transmits the first surface profile image and the second surface profile image to the host electronic device 210 of the production system 21 of the foil article 2.

Second Embodiment

Figure 5:
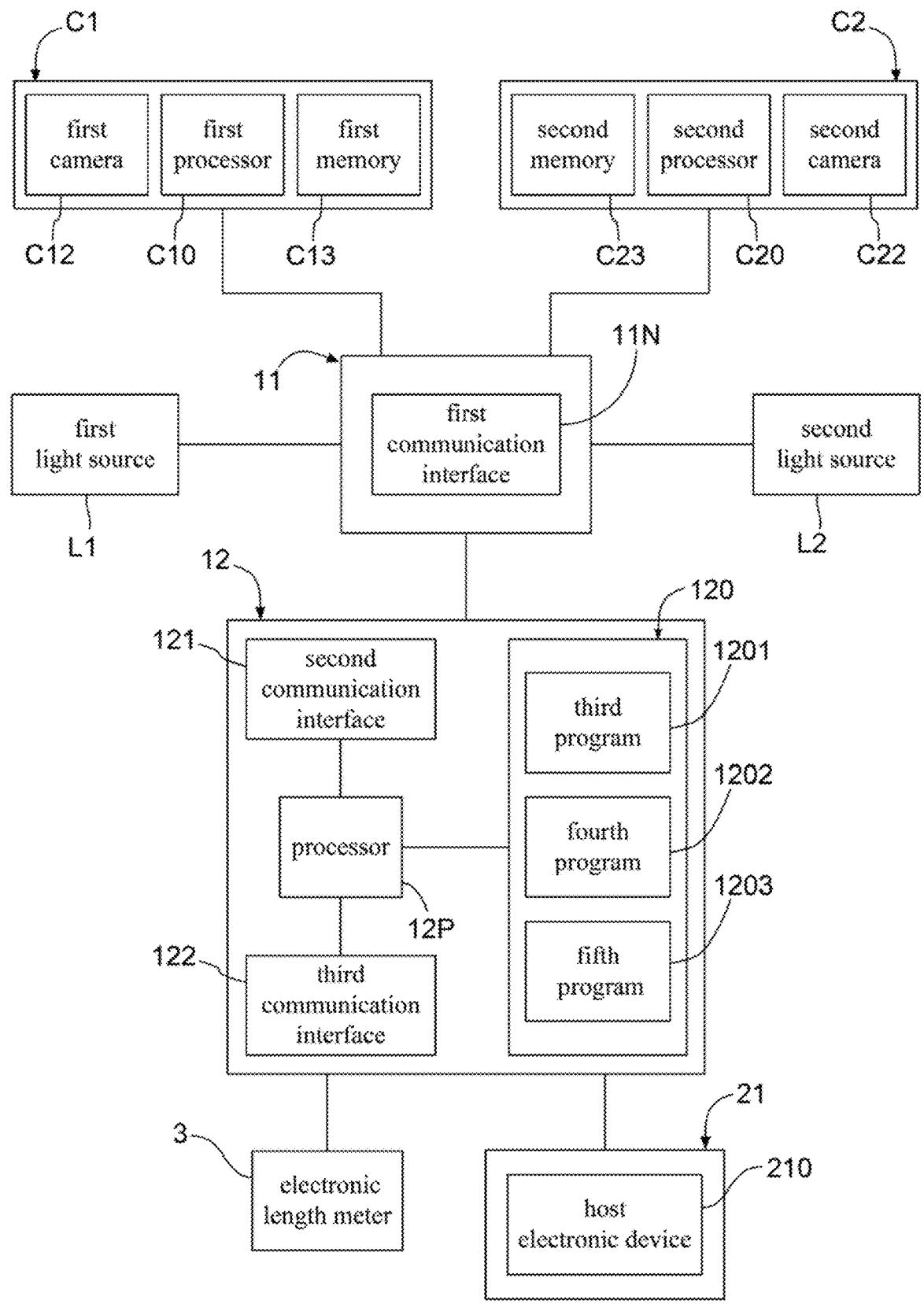
FIG. 5 shows a block diagram of a control box, the bridge board, the first light source, the second light source, the first modular camera device, and the second modular camera device they are shown in FIG. 2A.

With reference to FIG. 2A and FIG. 2B again, and please simultaneously refer to FIG. 5 that shows a block diagram of the control box 12, the bridge board 11, the first light source L1, the second light source L2, the first modular camera device C1, and the second modular camera device C2. In the second embodiment, the surface inspection system 1 also comprises a box 10, a bridge board 11, a first light source L1, a second light source L2, a first modular camera device C1, a second modular camera device C2, and a control box 12.

Particularly, in the second embodiment, a modular electronic device is disposed in the control box 12, wherein the modular electronic device comprises a processor 12P and a memory 120 storing a plurality of programs, and the plurality of programs comprising: a first program, a second program, a third program 1201, a fourth program 1202, and a fifth program 1203. According to the present invention, the first program is compiled to be integrated in the application program by one type of programming language, and includes instructions for configuring the processor 12P to control the first light source L1 and the second light source L2 to emit a first detection light and a second detection light for irradiating the first surface and the second surface of the foil article 2, respectively. On the other hand, the second program is compiled to be integrated in the application program by one type of programming language, and includes instructions for configuring the processor 12P to control the first camera C12 and the second camera C21 to acquire a first image and a second image from the first surface and the second surface of the foil article 2, respectively.

As FIG. 2A, FIG. 2B, FIG. 3 and FIG. 5 show, the third program 1201 is compiled to be integrated in the application program by one type of programming language, and includes instructions for configuring the processor 12P to extract a first surface feature and a second surface feature from the first image and the second image, respectively. Moreover, the fourth program 1202 is compiled to be integrated in the application program by one type of programming language, and includes instructions for configuring the processor 12P to utilize a pre-trained defect reorganization model to determine whether there are existing any surface defects in the first surface and the second surface of the foil article 2 by matching the first surface feature and the second surface feature with said reference defect feature, respectively. Furthermore, the fifth program 1203 is compiled to be integrated in the application program by one type of programming language, and includes instructions for configuring the processor 12P to produce a first surface profile image of the first surface and a second surface profile image of the second surface 2 based on the first surface feature and the second surface feature, respectively.

It is understood that, after producing the first surface profile image and the second surface profile image based on the first surface feature and the second surface feature, respectively, the control box 12 transmits the first surface profile image and the second surface profile image to the host electronic device 210 of the production system 21 of the foil article 2.

Therefore, through above descriptions, all embodiments and their constituting elements of the surface inspection system for foil article according to the present invention have been introduced completely and clearly. Moreover, the above description is made on embodiments of the present invention. However, the embodiments are not intended to limit the scope of the present invention, and all equivalent implementations or alterations within the spirit of the present invention still fall within the scope of the present invention.

What is claimed is:

1. A surface inspection system, comprising:
   a box, having a top long narrow opening and a bottom long narrow opening, such that a foil article is allowed to be fed into the box via the top long narrow opening, and being also allowed to be discharged from the box through the bottom long narrow opening;
   a bridge board, being disposed in the box, and comprising a power inlet and a power switch exposed out of the box;
   a first light source, being disposed in the box so as to be adjacent to a first side of the box, wherein the first light source is coupled to the bridge board, and there being a first spacing existing between the first light source and a bottom side of the box;
   a second light source, being disposed in the box so as to be adjacent to a second side of the box, wherein the second light source is coupled to the bridge board, and there being one said first spacing between the second light source and the bottom side of the box;
   a first modular camera device, being disposed in the box so as to be adjacent to the first side of the box, wherein the first modular camera device is coupled to the bridge board, and there being a second spacing existing between the first modular camera device and the bottom side of the box; and
   a second modular camera device, being disposed in the box so as to be adjacent to the second side of the box, wherein the second modular camera device is coupled to the bridge board, and there being one said second spacing existing between the second modular camera device and the bottom side of the box;
   wherein the second spacing is larger than the first spacing;
   wherein the first modular camera device comprises a first housing case and at least one first camera accommodated in the first housing case, and the at least one first camera being exposed out of the first housing case by a first lens thereof, such that the first lens faces to a first surface of the foil article in the box; and
   wherein the second modular camera device comprises a second housing case and at least one second camera accommodated in the second housing case, and the at least one second camera being exposed out of the second housing case by a second lens thereof, such that the second lens faces to a second surface of the foil article in the box,
   wherein a first electronic device is disposed in the first housing case so as to be coupled to the first camera, and the first electronic device comprises a first processor and a first memory storing an application program that includes instructions,
   wherein the application program consists of a plurality of subprograms, and the plurality of subprograms comprises:
   a first subprogram, being compiled to be integrated in the application program by one type of programming language, and including instructions for configuring the first processor to control the first light source to emit a first detection light for irradiating the first surface of the foil article;
   a second subprogram, being compiled to be integrated in the application program by one type of programming language, and including instructions for configuring the first processor to control the first camera acquire a first image from the first surface of the foil article;
   a third subprogram, being compiled to be integrated in the application program by one type of programming language, and including instructions for configuring the first processor to extract a first surface feature from the first image;
   a fourth subprogram, being compiled to be integrated in the application program by one type of programming language, and including instructions for configuring the first processor to utilize a pre-trained defect reorganization model so as to determine whether there are existing any surface defects in the first surface of the foil article by matching the first surface feature with a reference defect feature; and
   a fifth subprogram, being compiled to be integrated in the application program by one type of programming language, and including instructions for configuring the first processor to produce a first surface profile image of the first surface of the foil article based on the first surface feature.

2. The surface inspection system of claim 1, wherein the foil article is selected from a group consisting of metal foil, flexible substrate, paper, and adhesive-coated flexible substrate.

3. The surface inspection system of claim 1, wherein the bridge board further comprises a first communication interface.

4. The surface inspection system of claim 1, wherein the first light source and the second light source are both a linear light source.

5. The surface inspection system of claim 3, further comprising:
   a control box, having a second communication interface so as to be in communication with the first communication interface, and being coupled to the first light source, the second light source, the first modular camera device, and the second modular camera device.

6. The surface inspection system of claim 5, wherein the control box further has a third communication interface, so as to be in communication with a host electronic device of a production system of the foil article.

7. The surface inspection system of claim 6, wherein an electronic length meter is disposed to inside or outside the box, and being coupled to the control box, such that the control box controls the electronic length meter 3 to count a length of the foil article.

8. The surface inspection system of claim 6, wherein a second electronic device is disposed in the second housing case so as to be coupled to the second camera, the second electronic device comprising a second processor and a second memory storing an application program that includes instructions, and the application program consisting of a plurality of subprograms; the plurality of subprograms comprising:
　　a sixth subprogram, being compiled to be integrated in the application program by one type of programming language, and including instructions for configuring the second processor to control the second light source to emit a second detection light for irradiating the second surface of the foil article;
　　a seventh subprogram, being compiled to be integrated in the application program by one type of programming language, and including instructions for configuring the second processor to control the second camera acquire a second image from the second surface of the foil article;
　　an eighth subprogram, being compiled to be integrated in the application program by one type of programming language, and including instructions for configuring the second processor to extract a second surface feature from the second image;
　　a ninth subprogram, being compiled to be integrated in the application program by one type of programming language, and including instructions for configuring the second processor to utilize said pre-trained defect reorganization model to determine whether there are existing any surface defects in the second surface of the foil article by matching the second surface feature with said reference defect feature; and
　　a tenth subprogram, being compiled to be integrated in the application program by one type of programming language, and including instructions for configuring the second processor to produce a second surface profile image of the second surface of the foil article based on the second surface feature.

9. The surface inspection system of claim 7, wherein a modular electronic device is disposed in the control box, the modular electronic device comprising a processor and a memory storing a plurality of programs, and the plurality of programs comprising:
　　a first program, being compiled to be integrated in the application program by one type of programming language, and including instructions for configuring the processor to control the first light source and the second light source to emit a first detection light and a second detection light for irradiating the first surface and the second surface of the foil article, respectively;
　　a second program, being compiled to be integrated in the application program by one type of programming language, and including instructions for configuring the processor to control the first camera and the second camera to acquire a first image and a second image from the first surface and the second surface of the foil article, respectively;
　　a third program, being compiled to be integrated in the application program by one type of programming language, and including instructions for configuring the processor to extract a first surface feature and a second surface feature from the first image and the second image, respectively;
　　a fourth subprogram, being compiled to be integrated in the application program by one type of programming language, and including instructions for configuring the processor to utilize a pre-trained defect reorganization model to determine whether there are existing any surface defects in the first surface and the second surface of the foil article by matching the first surface feature and the second surface feature with said reference defect feature, respectively; and
　　a fifth subprogram, being compiled to be integrated in the application program by one type of programming language, and including instructions for configuring the processor to produce a first surface profile image of the first surface and a second surface profile image of the second surface based on the first surface feature and the second surface feature, respectively.

10. The surface inspection system of claim 6, wherein the first communication interface, the second communication interface and the third communication interface are all selected from a group consisting of Ethernet interface, Wi-Fi interface, 4G mobile communication interface, and 5G mobile communication interface.

11. The surface inspection system of claim 1, wherein the box is fixed in an product discharging side of a production system of the foil article through a first mounting framework, and comprising:
　　a framework, being constituted by a plurality of vertical rods and a plurality of horizontal rods, and including an inner space, an upper opening, a lower opening, a front opening, a rear opening, a left opening, and a right opening, wherein the inner space, the upper opening, the lower opening, the front opening, the rear opening, the left opening, and the right opening are all communicated with the inner space;
　　an upper cover, including said top long narrow opening, and being connected to the framework so as to shield the upper opening;
　　a lower cover, including said bottom long narrow opening, and being connected to the framework so as to shield the lower opening;
　　a left side plate, being connected to the framework so as to shield the left opening;
　　a right side plate, being connected to the framework so as to shield the right opening;
　　a front plate, being connected to the framework so as to shield the front opening, and including: a first opening for making the power inlet to be exposed out of the box, a second opening for making the power switch to be exposed out of the box, a third opening for making an Ethernet connector to be exposed out of the box, and a fourth opening;
　　a rear plate, being connected to the framework so as to shield the rear opening, and including a fifth opening a front cover, being connected to the front plate so as to shield the fourth opening; and
　　a rear cover, being connected to the rear plate so as to shield the fifth opening.

12. The surface inspection system of claim 11, wherein the first light source and the second light source are disposed on the framework through a second mounting framework and a third mounting framework, respectively, such that it is allowed to adjust the second mounting framework so as to make a first detection light emitted from the first light source irradiate the first surface of the foil article by an incidence angle, and it being also allowed to adjust the third mounting framework so as to make a second detection light emitted from the second light source irradiate the second surface of the foil article by said incidence angle.

13. The surface inspection system of claim 11, wherein an anti-abrasion film including a narrow slit is attached onto an inner side of the upper cover, such that the narrow slit faces the top long narrow opening.

14. The surface inspection system of claim 11, wherein an anti-abrasion film including a narrow slit is attached onto an inner side of the lower cover, such that the narrow slit faces the bottom long narrow opening.

15. The surface inspection system of claim 11, wherein an anti-corrosion material is coated onto the upper cover, the lower cover, the left side plate, the right side plate, the front plate, the rear plate, the front cover, the rear cover, a first case of the first light source, and a second case of the second light source.

16. The surface inspection system of claim 12, wherein an optical axis of the first lens is vertical to the first surface of the foil article, and an optical axis of the second lens is vertical to the second surface of the foil article.

* * * * *